(12) United States Patent
Bouda et al.

(10) Patent No.: US 11,061,837 B2
(45) Date of Patent: Jul. 13, 2021

(54) UBM IMPLEMENTATION INSIDE BMC

(71) Applicant: American Megatrends International, LLC, Duluth, GA (US)

(72) Inventors: Timothy Bouda, Ankeny, IA (US); Umasankar Mondal, Snellville, GA (US); Shibu Abraham, Duluth, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 0 days.

(21) Appl. No.: 16/547,225

(22) Filed: Aug. 21, 2019

(65) Prior Publication Data
US 2020/0065273 A1 Feb. 27, 2020

Related U.S. Application Data

(60) Provisional application No. 62/720,215, filed on Aug. 21, 2018.

(51) Int. Cl.
*G06F 13/20* (2006.01)
*G06F 13/42* (2006.01)
*G06F 1/24* (2006.01)

(52) U.S. Cl.
CPC ............... *G06F 13/20* (2013.01); *G06F 1/24* (2013.01); *G06F 13/4282* (2013.01)

(58) Field of Classification Search
CPC ......... G06F 13/20; G06F 13/4282; G06F 1/24
See application file for complete search history.

(56) References Cited

U.S. PATENT DOCUMENTS

| | | | | |
|---|---|---|---|---|
| 2009/0073669 A1* | 3/2009 | Hong | .................. | H05K 7/1459 361/788 |
| 2012/0020349 A1* | 1/2012 | Dunwoody | ........... | G06F 15/161 370/351 |
| 2012/0297098 A1* | 11/2012 | Li | ........................... | H04L 67/38 710/67 |
| 2015/0242357 A1* | 8/2015 | Pancholi | ............... | G06F 13/102 710/13 |

* cited by examiner

*Primary Examiner* — Henry Tsai
*Assistant Examiner* — John B Roche
(74) *Attorney, Agent, or Firm* — Locke Lord LLP; Tim Tingkang Xia, Esq.

(57) ABSTRACT

In an aspect of the disclosure, an apparatus, a computer-readable medium, and a method are provided. The apparatus may be a service processor. The service processor receives, a first command or data of a UBM protocol from a UBM host running on a host of the service processor. The UBM protocol is a first protocol supported by the service processor. The first command or data instructs a backplane controller of the host to perform a first task. The service processor generates a second command or data of a second protocol supported by the service processor. The second command or data instructs the backplane controller to perform the first task. The service processor sends the second command or data to the backplane controller.

17 Claims, 6 Drawing Sheets

UBM IMPLEMENTATION INSIDE BMC

CROSS-REFERENCE TO RELATED APPLICATION(S)

This application claims the benefits of U.S. Provisional Application Ser. No. 62/720,215, entitled "UBM IMPLEMENTATION INSIDE BMC" and filed on Aug. 21, 2018, which is expressly incorporated by reference herein in its entirety.

BACKGROUND

Field

The present disclosure relates generally to computer systems, and more particularly, to a Universal Backplane Management (UBM) stack implemented in a Baseboard Management Controller (BMC).

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

A UBM (Universal Backplane Management) controller implements pins and associated hardware circuitry to control LEDs and read the status of PCIe/NVMe SSD drives in a backplane. Additionally, it implements UBM stack/commands to communicate with a UBM host through I2C bus to manage the backplane. For a backplane controller to support UBM on top of current VPP/SHP and SGPIO protocol will require a larger, more expensive Microcontroller/CPLD. There, there is a need for a mechanism to address the aforementioned concerns.

DETAILED DESCRIPTION

Figure 1:
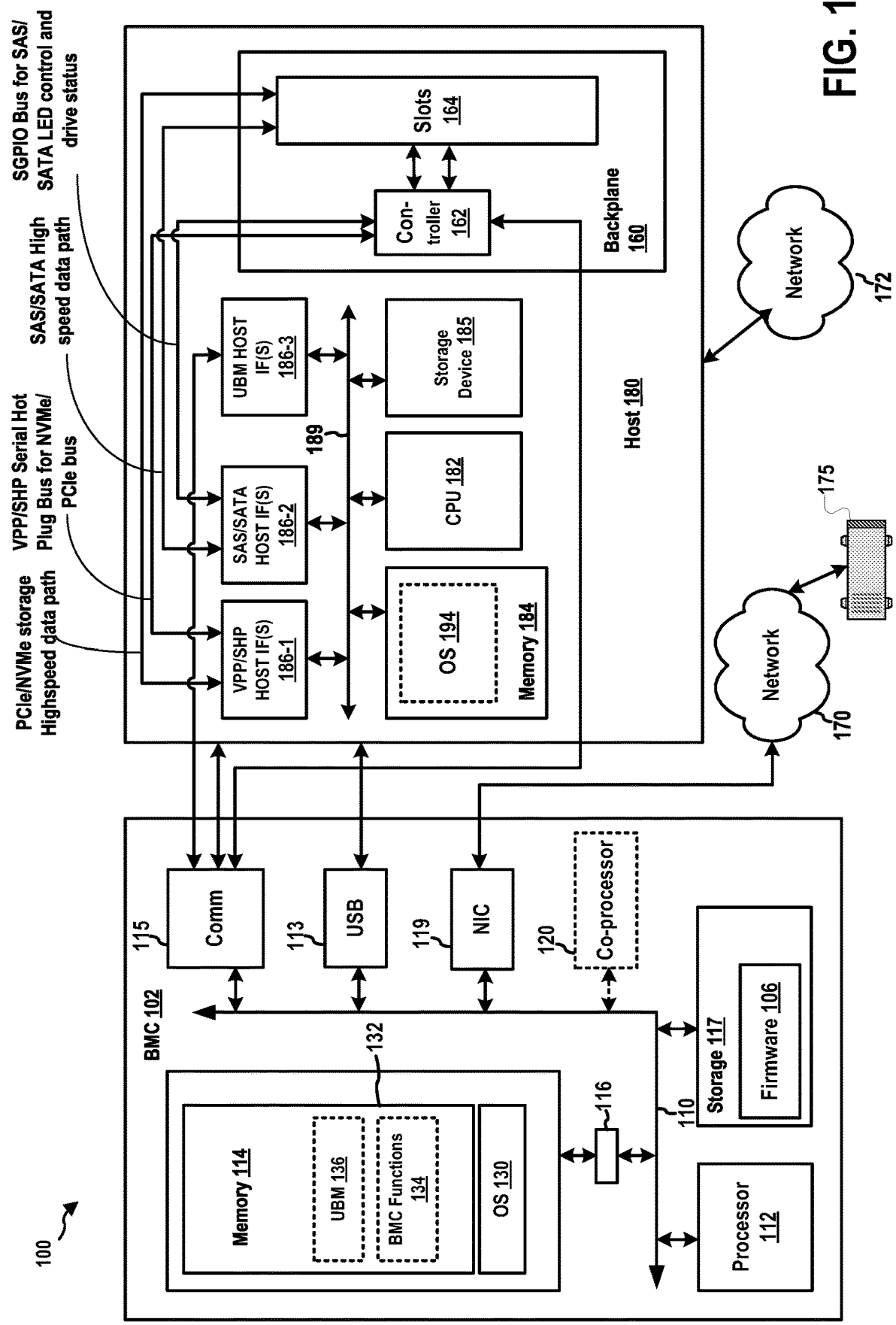
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE- PROM), optical disk storage, magnetic disk storage, other magnetic storage devices, combinations of the aforementioned types of computer-readable media, or any other medium that can be used to store computer executable code in the form of instructions or data structures that can be accessed by a computer.

In the present disclosure, BMC stands for baseboard management controller; NVMe stands for non-volatile memory express; PCIe stands for peripheral component interconnect express; HSBP stands for hot swap backplane controller; UBM stands for universal backplane management; OOB stands for out of band; KCS stands for keyboard controller style interface; IPMI stands for intelligent platform management interface; VPP stands for virtual port pin serial hot plug bus; SHP stands for serial hot plug bus; SGPIO stands for serial general purpose input/output bus; PCH stands for platform controller hub; USB stands for universal serial bus; SMBUS stands for system management bus; SATA stands for serial advanced technology attachment; SCSI stands for small computer systems interface; and SAS stands for serial attached SCSI.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a network interface card 119, a USB interface 113, and other communication interfaces 115.

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and service components 132. The service components 132 include, among other components, an BMC functions stack 134 and a UBM stack 136. As such, the BMC firmware 106 can provide an embedded system to the BMC 102. In addition, as described infra, the UBM stack 136 may processes UBM commands received from the host computer 180. As described infra, in a first technique, the UBM stack 136 is executed on the same processing unit 112 that executes the BMC functions stack 134. In a second technique, the BMC 102 also include a co-processor 120 that is in communication with the other components of the BMC 102 through the communication channel 110. Further, the UBM stack 136 is executed on the co-processor 120.

The BMC 102 may be in communication with the host computer 180 through the USB interface 113, the network interface card 119, the communication interfaces 115, and/or the IPMI interface.

The host computer 180 includes a host CPU 182, a host memory 184, a storage device 185, a VPP/SHP host interface(s) 186-1 for NVMe storage, a SAS/SATA host interface(s) 186-2, a UBM host interface(s) 186-3, which are in communication with each other through a bus 189, and a backplane 160. An operating system (OS) 194 may be loaded into the host memory 184. The UBM host interface(s) 186-3 implements "SFF-TA-1005 Specification for Universal Backplane Management (UBM); Rev 1.0; May 4, 2018," which is expressly incorporated by reference herein in its entirety. UBM provides a common management framework for SAS, SATA, and NVMe devices. Benefits of UBM may include: holistic support of SAS, SATA and PCIe (NVMe) backplanes; supporting storage topologies such as controller-, expander- and switch-attach; high-speed lane mapping descriptions; device slot and device presence information; management of LED states and slot power control; management of PCIe Reset and Reference Clock mechanisms; and Flexibility for future extensions.

The backplane 160 includes a backplane controller 162 and backplane slots 164. The VPP/SHP host interface(s) 186-1 for NVMe storage is in communication with the backplane controller 162 through one or more VPP/SHP serial hot plug buses for NVMe/PCIe buses and is in communication with the backplane slots 164 through one or more PCIe/NVMe storage highspeed data paths. The SAS/SATA host interface(s) 186-2 is in communication with the backplane controller 162 through one or more SGPIO buses and is in communication with the backplane slots 164 through one or more SAS/SATA high speed data paths. The UBM host interface(s) 186-3 for NVMe and SAS/SATA storage is in communication with the BMC 102 through the communication interfaces 115. The UBM stack 136 may communicate with the backplane controller 162 through the communication interfaces 115.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the BMC functions stack 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Figure 2:
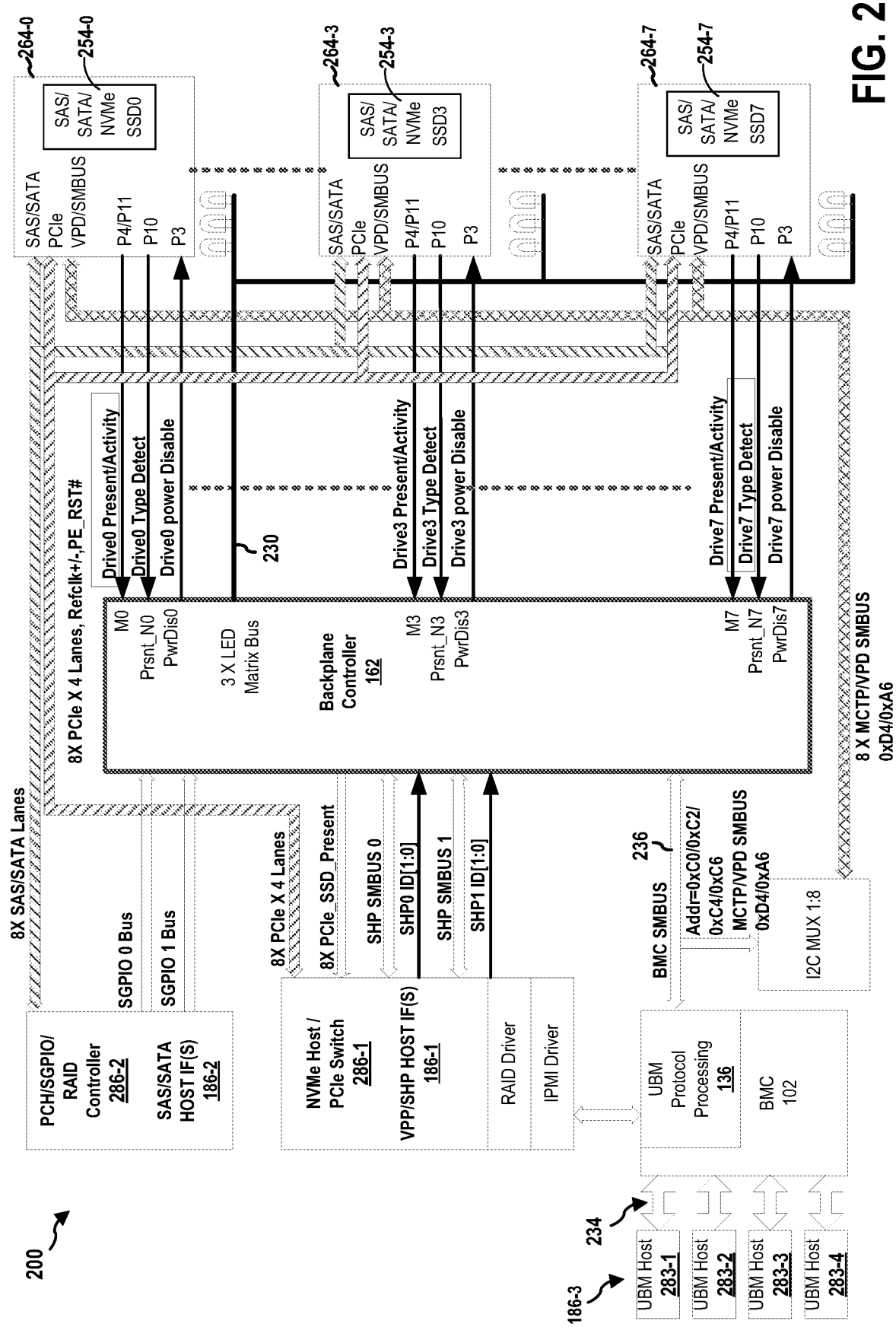
FIG. 2 is a diagram illustrating one configuration of the computer system.

FIG. 2 is a diagram 200 illustrating one configuration of the computer system 100. A PCH/SGPIO/RAID controller 286-2 of the host computer 180 implements the SAS/SATA host interface(s) 186-2. The PCH/SGPIO/RAID controller 286-2 is in communication with 8 SSDs 254-0 to 254-7 plugged on slots 264-0 to 264-7 through eight SAS/SATA lanes in accordance with SAS/SATA, respectively. The slots 264-0 to 264-7 constitute the backplane slots 164. As described supra, the PCH/SGPIO/RAID controller 286-2 can communicate with the backplane controller 162 through two SGPIO buses: SGPIO 0 bus and SGPIO 1 bus.

Further, a NVMe Host/PCIe switch 286-1 implements the VPP/SHP host interface(s) 186-1. The NVMe Host/PCIe switch 286-1 can be a volume management device (VMD) or a non-VMD. The NVMe Host/PCIe switch 286-1 is in communication with the eight SSDs 254-0 to 254-7 plugged on the slots 264-0 to 264-7 through 8 PCIe lanes, respectively. The NVMe Host/PCIe switch 286-1 can communicate with the backplane controller 162 through two SHP/VPP SMBUSes: SHP/VPP SMBUS 0 and SHP/VPP SMBUS 1.

In certain configurations, for each one of the slots 264-0 to 264-7, the backplane controller 162 has 3 pins (M0, Prsnt_N0, PwrDis0) that are in communication with 3 pins (P4/P11, P10, P3) of the slot, respectively. Through the connection between P4/P11 and M0, the slot can send signals to the backplane controller 162 to indicate a drive's presence/absence and activities to the backplane controller 162. For example, P4 may indicate drive presence/absence, and P11 may indicate drive activities. Through the connection between P10 and Prsnt_N0, the slot can send signals to the backplane controller 162 to indicate the type of the drive in the slot. For example, P10 can indicate the drive type is NVMe, SAS, or SATA. Through the connection between PwrDis0 and P3, the backplane controller 162 can send signals to the slot to power off the drive in the slot. For example, P3 may signal to disable drive power. Further, the backplane controller 162 is in communications with 3 LEDs through bus lines 230. In certain configurations, the drive and the drive type detection can utilize more pins.

UBM hosts 283-1 to 283-4 are in communication with the BMC 102 through I2C buses 234. Each of the UBM hosts 283-1 to 283-4 implements the UBM host interface(s) 186-3. The BMC 102 is in communication with the backplane controller 162 through a SMBUS 236. The UBM hosts 283-1 to 283-4 send UBM command or data to the BMC 102 through the I2C buses. The UBM stack 136 translates/converts the UBM command or data to specific command or data of the backplane controller 162. The BMC 102 then sends the specific command or data to the backplane controller 162 through the SMBUS. In particular, the specific command may be command to obtain a drive status and type, to reset a drive, to power off a drive, and to control LEDs associated with the drive.

Figure 3:
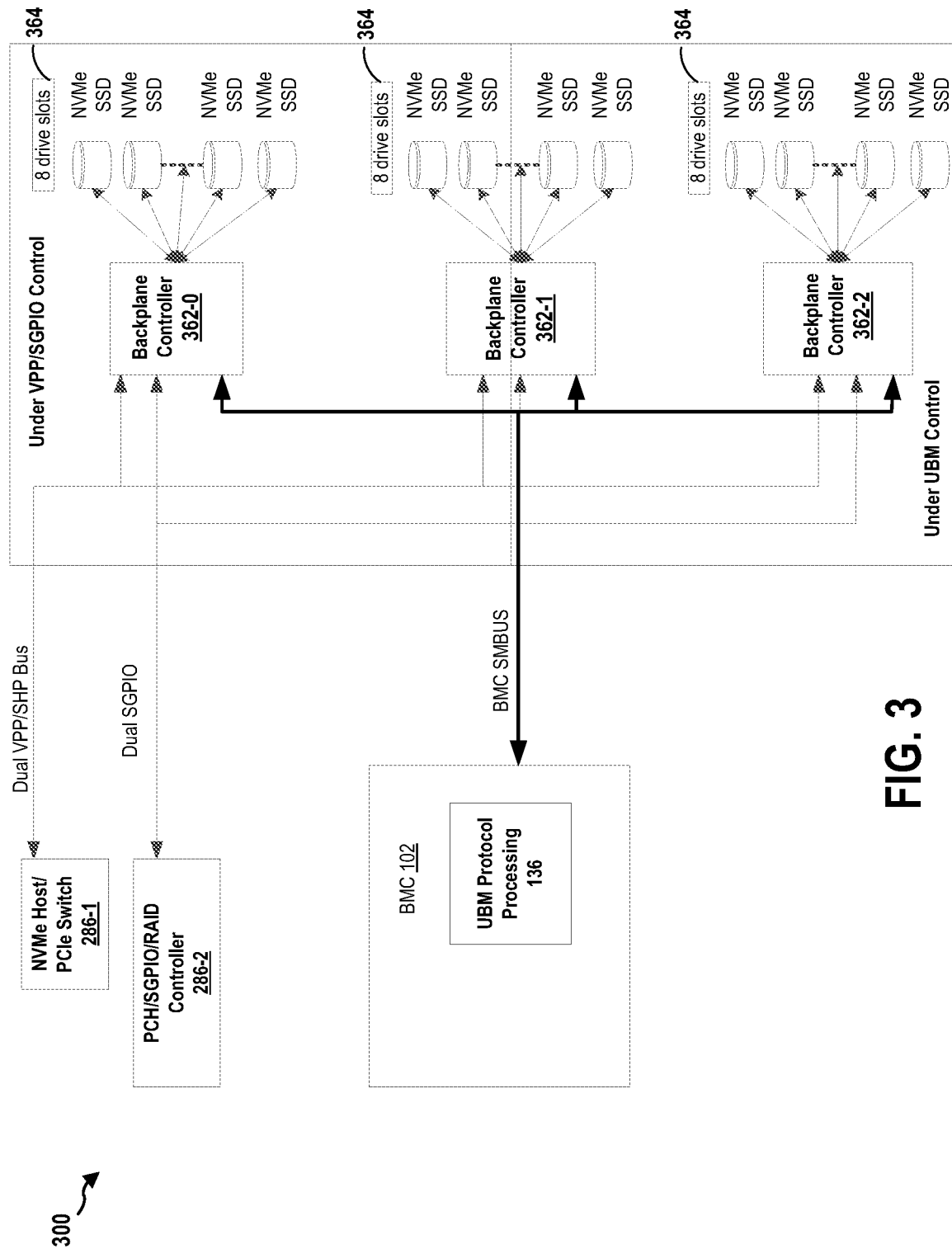
FIG. 3 is a diagram illustrating another configuration of the computer system.

FIG. 3 is a diagram 300 illustrating another configuration of the computer system 100. In this configuration, the NVMe Host/PCIe switch 286-1, the PCH/SGPIO/RAID controller 286-2, the UBM stack 136 of the BMC 102 in the computer system 100 each are connected with backplane controllers 362-0 to 362-2. Each of the backplane controllers 362-0 to 362-2 connects with 8 backplane slots 364 (which are similar to slots 264-0 to 264-7) on a backplane. Control of each set of backplane slots 364 is configurable such that part of the backplane slots 364 may be controlled by the SAS/SATA host interface(s) 186-2, part of the backplane slots 364 may be controlled by the VPP/SHP host interface(s) 186-1, and part of the backplane slots 364 may be controlled by the UBM host interface(s) 186-3. In this example, the NVMe Host/PCIe switch 286-1 and/or the PCH/SGPIO/RAID controller 286-2 control the 8 backplane slots 364 connected to the backplane controller 362-0 and 4 of the 8 backplane slots 364 connected to the backplane controller 362-1. Further, the UBM stack 136 controls the 8 backplane slots 364 connected to the backplane controller 362-2 and 4 of the 8 backplane slots 364 connected to the backplane controller 362-1.

Figure 4:
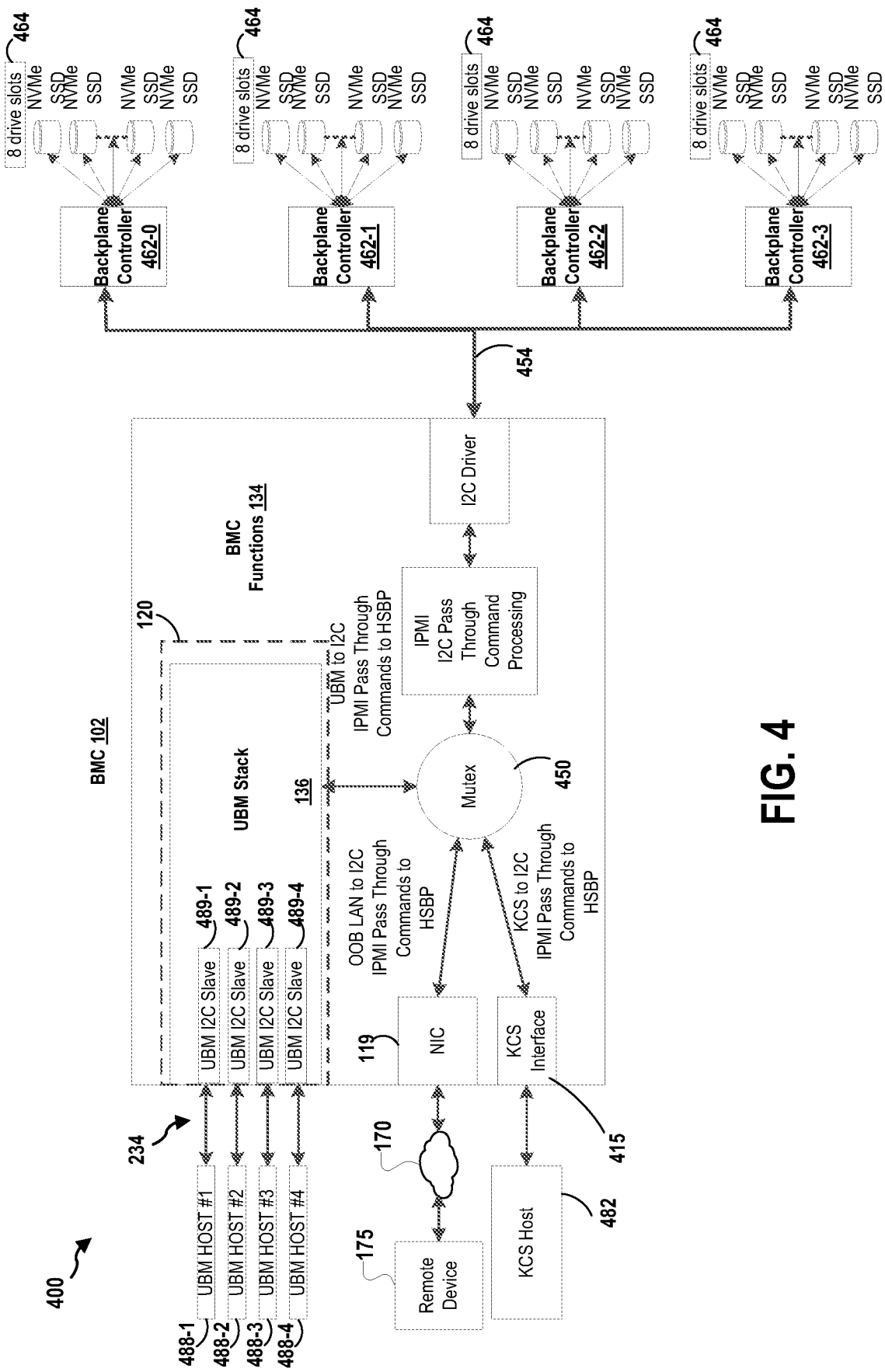
FIG. 4 is a diagram illustrating implementations of a UBM service stack.

FIG. 4 is a diagram 400 illustrating implementations of a UBM service stack. In a first technique, the UBM stack 136 is executed on the same processor (core) of the processing unit 112 of the BMC 102 that executes the BMC functions stack 134. In this example, the host computer 180 has UBM hosts 488-1 to 488-4 each implementing the UBM host interface(s) 186-3. Further, the UBM stack 136 on the BMC 102 provides UBM slaves 489-1 to 489-4. The UBM hosts 488-1 to 488-4 may be in communication with the UBM slaves 489-1 to 489-4 through I2C buses 234 between the host computer 180 and the BMC 102, as described supra. The UBM hosts 488-1 to 488-4 communicates with and controls the UBM slaves 489-1 to 489-4, respectively, in accordance with UBM protocols. Further, in this example, the BMC 102 is also in communication with backplane controllers 462-0 to 462-3 through an I2C bus 454. Each of the backplane controllers 462-0 to 462-3 manages a set of backplane slots 464. In particular, the BMC 102 has a I2C driver 448 that generates signals to be transmitted on the I2C bus 454.

As described supra, the BMC 102 has a network interface card 119 connected to the communication network 170. The BMC 102 also has a KCS interface 415, which is a part of the communication interfaces 115. The remote device 175 may send an IPMI message containing a specific command or data described supra to the BMC 102 over the communication network 170. The remote device 175 may also indicate in the IPMI message that the specific command or data contained in the IPMI message is to be passed through to one or more of the backplane controllers 462-0 to 462-3. The BMC functions stack 134 receives the IPMI message through the network interface card 119. Based on the indication in the IPMI message, the BMC functions stack 134 determines that the IPMI message is to be forwarded to the backplane controllers 462-0 to 462-3. Accordingly, the BMC functions stack 134 sends the IPMI message to an IPMI-I2C-pass-through-command-processing component 446 through a Mutex 450. The specific command or data may be in accordance with SAS/SATA, SGPIO, NVMe, PCIe, VPP, SHP, or other suitable interfaces or protocols.

Further, an KCS host 482 on the host computer 180 can transfer an IPMI message containing a specific command or data described supra to the BMC 102 through the KCS interface 415. The IPMI message may contain an indication indicating that the specific command or data contained in the IPMI message is to be passed through to one or more of the backplane controllers 462-0 to 462-3. The BMC functions stack 134 receives the IPMI message through the KCS interface 415. Based on the indication in the IPMI message, the BMC functions stack 134 determines that the IPMI message is to be forwarded to the backplane controllers 462-0 to 462-3. Accordingly, the BMC functions stack 134 sends the IPMI message to an IPMI-I2C-pass-throughcommand-processing component 446 through the Mutex 450. The specific command or data may be in accordance with SAS/SATA, SGPIO, NVMe, PCIe, VPP, SHP, or other suitable interfaces or protocols.

Further, the UBM stack 136 executed on the processing unit 112 of the BMC 102 may receive a UBM command or data from the UBM hosts 488-1 to 488-4 through the I2C buses 234. The UBM stack 136 then translates/converts the UBM command or data to a specific command or data of the backplane controllers 462-0 to 462-3. The specific command or data may be in accordance with SAS/SATA, SGPIO, NVMe, PCIe, VPP, SHP, or other suitable interfaces or protocols. As described supra, the specific command or data may be command to obtain a drive status and type, to reset a drive, to power off a drive, and to control LEDs associated with the drive. Then the UBM stack 136 constructs an IPMI message and places the specific command or data in the IPMI message. The IPMI message may be an IPMI OEM command, which may be vendor/user specific. The UBM stack 136 then sends the IPMI message to the IPMI-I2C-pass-through-command-processing component 446 in the BMC functions stack 134 through the Mutex 450.

The Mutex 450 is connected with each of the UBM stack 136, the network interface card 119, and the KCS interface 415 and may receive messages from each of the UBM stack 136, the network interface card 119, and the KCS interface 415. The Mutex 450 transfers one of the received IPMI messages to the IPMI-I2C-pass-through-command-processing component 446 at a time. The IPMI-I2C-pass-through-command-processing component 446 extracts the specific command or data from the IPMI message. As described supra, the specific command or data may be in accordance with SAS/SATA, NVMe, PCIe, or other suitable protocols. The IPMI-I2C-pass-through-command-processing component 446 operates the I2C driver 448 to generate signals carrying the specific command or data and transmits those signals on the I2C bus 454. The I2C bus 454 may be private I2C buses (as defined by the IPMI specification). Each of the backplane controllers 462-0 to 462-3 listens to the signals transmitted on the I2C bus 454 and processes the command or data carried in the signals that are addressed to itself. As such, each of the backplane controllers 462-0 to 462-3 can operate the set of backplane slots 464 connected to itself.

In a second technique, the UBM stack 136 is executed on the co-processor 120. The UBM hosts 488-1 to 488-4 are in communication with the co-processor 120 through the I2C buses 234 and may receive a UBM command or data from the UBM hosts 488-1 to 488-4. The UBM stack 136 then translates/converts the UBM command or data to a specific command or data of the backplane controllers 462-0 to 462-3. As described supra, the specific command or data may be command to obtain a drive status and type, to reset a drive, to power off a drive, and to control LEDs associated with the drive. Then the UBM stack 136 constructs an IPMI message and places the specific command or data in the IPMI message. The IPMI message may be an IPMI OEM command, which may be vendor/user specific. The UBM stack 136 then sends the IPMI message to the IPMI-I2C-pass-through-command-processing component 446 in the BMC functions stack 134 through the Mutex 450.

Figure 5:
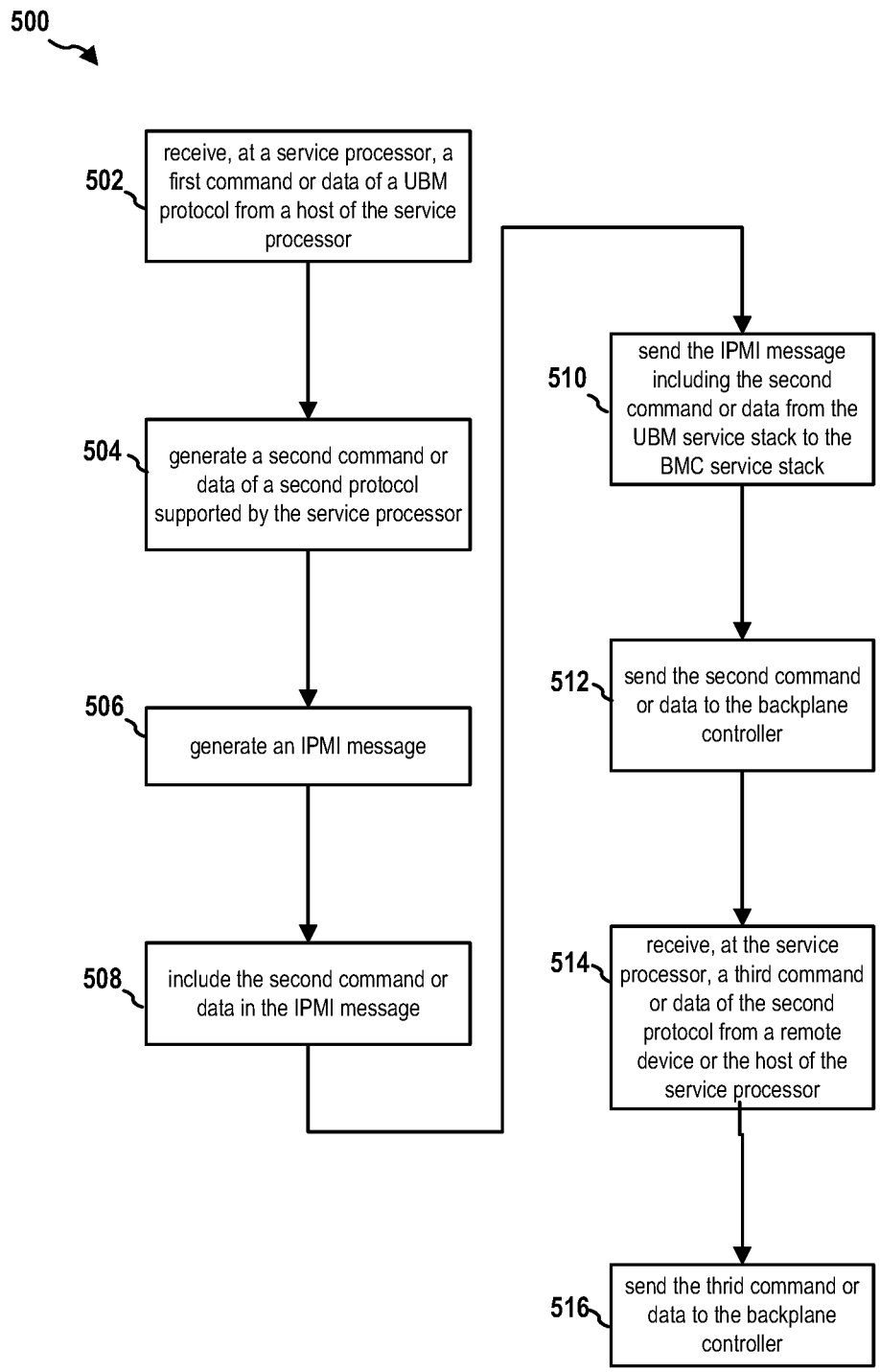
FIG. 5 is a flow chart of a method (process) for handling UBM command or data.

FIG. 5 is a flow chart 500 of a method (process) for handling UBM command or data. The method may be performed by a service processor (e.g., the BMC 102). At operation 502, the service processor receives a first command or data of a UBM protocol from a UBM host running on a host of the service processor. The UBM protocol is a first protocol supported by the service processor. The first command or data instructs a backplane controller of the host to perform a first task.

At operation 504, the service processor generates a second command or data of a second protocol supported by the service processor, the second command or data instructing the backplane controller to perform the first task.

In certain configurations, the service processor executes a BMC service stack and a UBM service stack on the same processing unit of the service processor. The UBM service stack implements an interface for communicating commands or data in accordance with UBM protocols.

In certain configurations, the service processor executes a BMC service stack on a main processing unit of service processor. The service processor executes a UBM service stack on a co-processing unit of the service processor. The first command or data is received at the UBM service stack.

In certain configurations, at operation 506, the UBM service stack generates an IPMI message. At operation 508, the UBM service stack includes the second command or data in the IPMI message. At operation 510, the UBM service stack sends the IPMI message including the second command or data to the BMC service stack.

At operation 512, the BMC service stack sends the second command or data to the backplane controller. In certain configurations, the second protocol is in compliance with at least one of: serial attached small computer systems interface (SCSI) (SAS) specification, serial advanced technology attachment (SATA) specification, serial general purpose input/output bus (SGPIO) specification, non-volatile memory express (NVMe) specification, peripheral component interconnect express (PCIe) specification, virtual port pin serial hot plug bus (VPP) specification, and serial hot plug bus (SHP) specification.

In certain configurations, the first task is at least one of: obtaining status and type of a drive plugged in a backplane slot controlled by the backplane controller, resetting the drive, powering off a drive, and controlling LEDs associated with the slot to indicate activities of the drive.

At operation 514, the service processor receives a third command or data of the second protocol from a remote device or the host of the service processor. The third command or data instructing a backplane controller of the host to perform a first task. At operation 516, the service processor sends the third command or data to the backplane controller.

Figure 6:
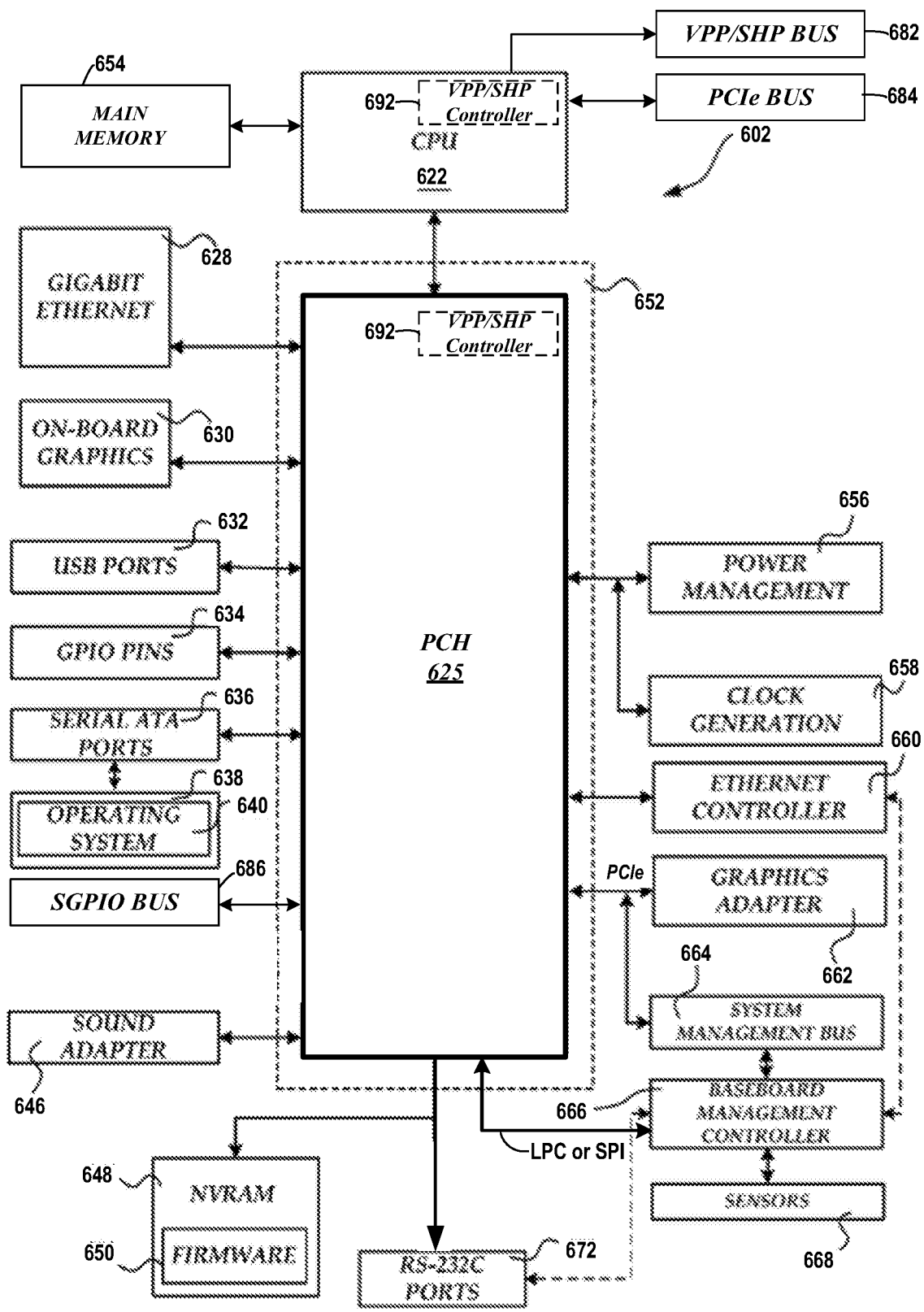
FIG. 6 shows a computer architecture for a computer.

FIG. 6 and the following discussion are intended to provide a brief, general description of one suitable computing environment in which aspects of the embodiments described herein may be implemented. In particular, FIG. 6 shows a computer architecture for a computer 602 that may be utilized to embody the host computer 180, as described supra. It should be appreciated that the computer architecture shown in FIG. 6 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. As shown, a main memory 654 may be in direct communication with the CPU 622.

The computer 602 shown in FIG. 6 includes a baseboard, or "motherboard," which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622. In certain configurations, the CPU 622 may contain a VPP/SHP serial hot plug bus controller 692. The CPU 622 may further be attached with one or more VPP/SHP buses 682. The CPU 622 may also be attached with one or more PCIe buses 684.

The chipset 652 includes a platform controller hub (PCH) 625. The PCH 625 provides an interface between the CPU 622 and the remainder of the computer 602. The PCH 625 may be connected to an on-board graphics adapter 630. The PCH 625 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. In certain configurations, the PCH 625 may contain a VPP/SHP serial hot plug bus controller 692.

The PCH 625 may also be responsible for controlling many of the input/output functions of the computer 602. In particular, the PCH 625 may provide one or more USB ports 632, a sound adapter 646, a power management controller 656, a clock generation controller 658, an Ethernet controller 660, and one or more GPIO pins 634. The PCH 625 may also provide a bus for interfacing peripheral card devices such as a graphics adapter 662. In one embodiment, the bus comprises a PCI bus. The PCH 625 may also provide a system management bus 664 for use in managing the various components of the computer 602. Additional details regarding the operation of the system management bus 664 and its connected components are provided below. In certain configures, the PCH 625 may also provide a SGPIO bus 686. In certain configurations, the PCH 625 may contain a VPP/SHP serial hot plug bus controller 692.

The PCH 625 may also be operative to provide one or more interfaces for connecting mass storage devices to the computer 602. For instance, according to an embodiment, the PCH 625 may include a serial advanced technology attachment ("SATA") adapter for providing one or more SATA ports 636. The SATA ports 636 may be, in turn, connected to one or more mass storage devices such as the SATA disk drive 638 storing an operating system 640 and application programs.

As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention the operating system 640 comprises an operating system within the WINDOWS family of operating systems from MICROSOFT CORPORATION. According to another embodiment, the operating system 640 comprises the UNIX, LINUX, or SOLARIS operating system. It should be appreciated that other operating systems may also be utilized.

The mass storage devices connected to the PCH 625, and their associated computer storage media, provide non-volatile storage for the computer 602. Although the description of computer storage media contained herein refers to a mass storage device, such as a hard disk or CD-ROM drive, it should be appreciated by those skilled in the art that computer storage media can be any available media that can be accessed by the computer 602.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the PCH 625 the LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the PCH 625 may include a system management bus 664. The system management bus 664 may be connected to a BMC 666, which may also be connected to the PCH 625 through LPC or SPI interface. The PCH 625 may be in communication with the BMC 666 through RS-232C ports 672. The BMC 666 may be the BMC 102. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should also be appreciated that the computer 602 may comprise other types of computing devices, including handheld computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

It should also be appreciated that the computer 602 may comprise other types of computing devices, including handheld computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a service processor, comprising:
   executing a baseboard management controller (BMC) service stack and a Universal Backplane Management (UBM) service stack on a same processing unit of the service processor, the UBM service stack implementing an interface for communicating commands or data in accordance with UBM protocols;
   receiving, at the UBM service stack on the service processor, a first command or data of a UBM protocol from a UBM host running on a host of the service processor, the UBM protocol being a first protocol supported by the service processor, the first command or data instructing a backplane controller of the host to perform a first task;
   generating a second command or data of a second protocol supported by the service processor, the second command or data instructing the backplane controller to perform the first task; and
   sending the second command or data to the backplane controller.

2. The method of claim 1, further comprising:
   generating an Intelligent Platform Management Interface (IPMI) message;
   including the second command or data in the IPMI message; and
   sending the IPMI message including the second command or data from the UBM service stack to the BMC service stack.

3. The method of claim 1, wherein the second protocol is in compliance with at least one of:
   serial attached small computer systems interface (SCSI) (SAS) specification,
   serial advanced technology attachment (SATA) specification,
   serial general purpose input/output bus (SGPIO) specification,
   non-volatile memory express (NVMe) specification,
   peripheral component interconnect express (PCIe) specification,
   virtual port pin serial hot plug bus (VPP) specification, and
   serial hot plug bus (SHP) specification.

4. The method of claim 1, wherein the first task is at least one of:
   obtaining status and type of a drive plugged in a backplane slot controlled by the backplane controller,
   resetting the drive,
   powering off a drive, and
   controlling LEDs associated with the slot to indicate activities of the drive.

5. The method of claim 1, further comprising:
   receiving, at the service processor, a third command or data of the second protocol from a remote device or the host of the service processor, the third command or data instructing a backplane controller of the host to perform a first task; and
   sending the third command or data to the backplane controller.

6. A method of operating a service processor, comprising:
   executing a baseboard management controller (BMC) service stack on a main processing unit of the service processor;
   executing a Universal Backplane Management (UBM) stack on a co-processing unit of the service processor, the UBM service stack implementing an interface for communicating commands or data in accordance with UBM protocols;

receiving, at the UBM service stack on the co-processing unit of the service processor, a first command or data of a UBM protocol from a UBM host running on a host of the service processor, the UBM protocol being a first protocol supported by the service processor, the first command or data instructing a backplane controller of the host to perform a first task;

generating a second command or data of a second protocol supported by the service processor, the second command or data instructing the backplane controller to perform the first task; and sending the second command or data to the backplane controller.

7. An apparatus, the apparatus being a service processor, comprising:

a memory; and first at least one processor coupled to the memory and configured to:

execute a baseboard management controller (BMC) service stack and a Universal Backplane Management (UBM) service stack on a same processing unit of the service processor, the UBM service stack implementing an interface for communicating commands or data in accordance with UBM protocols;

receive, at the UBM service stack on the service processor, a first command or data of a UBM protocol from a UBM host running on a host of the service processor, the UBM protocol being a first protocol supported by the service processor, the first command or data instructing a backplane controller of the host to perform a first task;

generate a second command or data of a second protocol supported by the service processor, the second command or data instructing the backplane controller to perform the first task; and send the second command or data to the backplane controller.

8. The apparatus of claim 7, wherein the first at least one processor is further configured to:

generate an Intelligent Platform Management Interface (IPMI) message;

include the second command or data in the IPMI message; and send the IPMI message including the second command or data from the UBM service stack to the BMC service stack.

9. The apparatus of claim 7, wherein the second protocol is in compliance with at least one of:

serial attached small computer systems interface (SCSI) (SAS) specification, serial advanced technology attachment (SATA) specification, serial general purpose input/output bus (SGPIO) specification, non-volatile memory express (NVMe) specification, peripheral component interconnect express (PCIe) specification, virtual port pin serial hot plug bus (VPP) specification, and serial hot plug bus (SHP) specification.

10. The apparatus of claim 7, wherein the first task is at least one of:

obtaining status and type of a drive plugged in a backplane slot controlled by the backplane controller, resetting the drive, powering off a drive, and controlling LEDs associated with the slot to indicate activities of the drive.

11. The apparatus of claim 7, wherein the first at least one processor is further configured to:

receive, at the service processor, a third command or data of the second protocol from a remote device or the host of the service processor, the third command or data instructing a backplane controller of the host to perform a first task; and send the third command or data to the backplane controller.

12. An apparatus, the apparatus being a service processor, comprising:

a memory; and first at least one processor coupled to the memory and configured to:

execute a baseboard management controller (BMC) service stack on a main processing unit of the service processor; and wherein the apparatus further comprises second at least one processor configured to:

execute a Universal Backplane Management (UBM) stack, the UBM service stack implementing an interface for communicating commands or data in accordance with UBM protocols;

receive, at the UBM service stack, a first command or data of a UBM protocol from a UBM host running on a host of the service processor, the UBM protocol being a first protocol supported by the service processor, the first command or data instructing a backplane controller of the host to perform a first task;

generate a second command or data of a second protocol supported by the service processor, the second command or data instructing the backplane controller to perform the first task; and send the second command or data to the backplane controller.

13. A non-transitory computer-readable medium storing computer executable code for operating a service processor, comprising code to:

execute a baseboard management controller (BMC) service stack and a Universal Backplane Management (UBM) service stack on a same processing unit of the service processor, the UBM service stack implementing an interface for communicating commands or data in accordance with UBM protocols;

receive, at the UBM service stack on the service processor, a first command or data of a UBM protocol from a UBM host running on a host of the service processor, the UBM protocol being a first protocol supported by the service processor, the first command or data instructing a backplane controller of the host to perform a first task;

generate a second command or data of a second protocol supported by the service processor, the second command or data instructing the backplane controller to perform the first task; and send the second command or data to the backplane controller.

14. The non-transitory computer-readable medium of claim 13, wherein the code is further configured to:

generate an Intelligent Platform Management Interface (IPMI) message;

include the second command or data in the IPMI message; and send the IPMI message including the second command or data from the UBM service stack to the BMC service stack.

15. The non-transitory computer-readable medium of claim 13, wherein the second protocol is in compliance with at least one of:
    serial attached small computer systems interface (SCSI) (SAS) specification,
    serial advanced technology attachment (SATA) specification,
    serial general purpose input/output bus (SGPIO) specification,
    non-volatile memory express (NVMe) specification,
    peripheral component interconnect express (PCIe) specification,
    virtual port pin serial hot plug bus (VPP) specification, and
    serial hot plug bus (SHP) specification.

16. The non-transitory computer-readable medium of claim 13, wherein the first task is at least one of:
    obtaining status and type of a drive plugged in a backplane slot controlled by the backplane controller,
    resetting the drive,
    powering off a drive, and
    controlling LEDs associated with the slot to indicate activities of the drive.

17. A non-transitory computer-readable medium storing computer executable code for operating a service processor, comprising code to:
    execute a baseboard management controller (BMC) service stack on a main processing unit of the service processor; and
    execute a Universal Backplane Management (UBM) stack on a co-processing unit of the service processor, the UBM service stack implementing an interface for communicating commands or data in accordance with UBM protocols;
    receive, at the UBM service stack on the co-processing unit of the service processor, a first command or data of a UBM protocol from a UBM host running on a host of the service processor, the UBM protocol being a first protocol supported by the service processor, the first command or data instructing a backplane controller of the host to perform a first task;
    generate a second command or data of a second protocol supported by the service processor, the second command or data instructing the backplane controller to perform the first task; and
    send the second command or data to the backplane controller.

* * * * *